United States Patent [19]
Barnes

[11] Patent Number: 5,897,050
[45] Date of Patent: Apr. 27, 1999

[54] CONTAINER COMPRISING A BASE AND AN UPSTANDING PERIPHERAL WALL EXTENDING UPWARDLY FROM SAID BASE TO AN APEX

[76] Inventor: Derek L. Barnes, 63 The Meadway, Cuffley, Hertfordshire EN6 4ET, United Kingdom

[21] Appl. No.: 08/776,305
[22] PCT Filed: Jul. 17, 1995
[86] PCT No.: PCT/GB95/01675
§ 371 Date: Jan. 17, 1997
§ 102(e) Date: Jan. 17, 1997
[87] PCT Pub. No.: WO96/02423
PCT Pub. Date: Feb. 1, 1996

[30] Foreign Application Priority Data

Jul. 18, 1994 [GB] United Kingdom .................... 9414450
Mar. 29, 1995 [GB] United Kingdom .................... 9506411

[51] Int. Cl.⁶ ..................................................... B65D 5/42
[52] U.S. Cl. ..................... 229/112; 229/115; 229/117.14; 229/207; 229/247
[58] Field of Search .................................... 229/112, 115, 229/117.14, 207, 212, 216, 247, 248, 915

[56] References Cited

U.S. PATENT DOCUMENTS

| | | | |
|---|---|---|---|
| 662,969 | 12/1900 | Roth | 229/115 |
| 879,488 | 2/1908 | Pitkin | 229/112 |
| 1,670,694 | 5/1928 | Storhow | 229/115 |
| 2,138,718 | 11/1938 | Wheeler | 229/112 |
| 3,731,869 | 5/1973 | Griffin | 229/117.14 |
| 4,744,467 | 5/1988 | Jonsson et al. | |

FOREIGN PATENT DOCUMENTS

| | | | |
|---|---|---|---|
| 553203 | 1/1960 | Belgium | 229/115 |
| 442035 | 8/1991 | European Pat. Off. | |
| 511680 | 11/1992 | European Pat. Off. | |
| 543766 | 5/1993 | European Pat. Off. | |
| 848 557 | 11/1939 | France | |
| 848.557 | 11/1939 | France | |
| 862 545 | 11/1952 | Germany | |
| 862545 | 1/1953 | Germany | |
| 861714 | 6/1986 | Germany | |
| 86 17 140 | 8/1986 | Germany | |
| 1005355 | 7/1993 | Germany | |
| 507190 | 12/1937 | United Kingdom | |
| 548553 | 4/1941 | United Kingdom | |
| 548828 | 4/1941 | United Kingdom | |
| 703589 | 6/1952 | United Kingdom | |
| 732682 | 7/1953 | United Kingdom | |
| 736319 | 10/1953 | United Kingdom | |
| 14444953 | 7/1973 | United Kingdom | |
| 2029203 | 3/1980 | United Kingdom | |
| 2209327 | 5/1989 | United Kingdom | |
| 2228038 | 8/1990 | United Kingdom | |
| 2253004 | 8/1992 | United Kingdom | |
| 93/18980 | 9/1993 | WIPO | |

*Primary Examiner*—Gary E. Elkins
*Attorney, Agent, or Firm*—Pillsbury Madison & Sutro LLP

[57] ABSTRACT

A container for solids or liquids is formed to have two walls which converge and meet at the apex thereof. A container opening is formed at the apex. Each of the walls converging at the apex is extended beyond the apex to form a flap or spout hingedly connected to the container at its apex. The contents may be sealed in the container by making the flap or spout to be an enclosed triangular shape and/or by sealing the flap or spout against one of the converging walls. Thus, access to the contents of the container requires either that the triangular spout or flap be cut, and/or that it be unsealed from the wall. The container may be resealed by applying a plastic clip to the folded flap or spout and/or by providing a reusable fastening to selectively retain the flap or spout against one of the converging walls. The container has a triangular configuration at its apex. This configuration may be continued throughout the whole of the container or it may be provided at its upper portion only.

9 Claims, 6 Drawing Sheets

CONTAINER COMPRISING A BASE AND AN UPSTANDING PERIPHERAL WALL EXTENDING UPWARDLY FROM SAID BASE TO AN APEX

This application is the national phase of international application PCT/GB95/01675 filed Jul. 17, 1995 which designated the U.S.

The present invention relates to containers.

Increasingly, milk and other liquids are sold in cartons or packages formed from coated card or cardboard. However, it is a constant criticism of the packages currently available that they are difficult to open. Furthermore, once the carton has been opened, the resultant pouring characteristics of the opened carton are poor. It is also difficult to reseal many of these liquid containers.

It is an object of the present invention to provide a container in which the disadvantages described above are reduced.

According to a first aspect of the present invention there is provided a container comprising a substantially planar base and an upstanding peripheral wall extending upwardly from said base to an apex, wherein said apex is defined by first and second converging wall portions of said peripheral wall, and wherein at least one of said first and second wall portions is extended beyond said apex to define a hinged flap for closing a container opening located at or proximate to said apex.

The provision of the hinged flap enables the container opening to be selectively reclosed. Sealing or fastening means may be provided on the hinged flap and on one of the converging wall portions so that the container opening may be resealed.

In a preferred embodiment, said container opening is substantially linear and extends along the apex line at which said first and second wall portions meet.

Alternatively, said container opening is formed in one of said first and second wall portions and is arranged to be closed by said hinged flap.

In one embodiment, which is particularly straightforward to construct, said first and second wall portions are each extended to together define the hinged flap. For example, the first and second wall portions in said hinged flap are separable such that said hinged flap forms a spout.

In a preferred embodiment, the container has a substantially rectangular base, and at said apex two opposed wall portions of said peripheral wall converge to define the container opening, and wherein said container opening extends across one of said wall portions and is spaced above but is generally in alignment with one side edge of said base. In this respect, said one wall portion across which the container opening extends is preferably substantially planar and extends substantially perpendicularly to the base of the container.

The present invention also extends to a container comprising a substantially rectangular base, and a peripheral wall extending upwardly from said base to an apex, wherein at said apex two opposed wall portions of said peripheral wall converge to define a container opening, and wherein said container opening extends across one of said wall portions and is spaced above but is generally in alignment with one side edge of said base.

Preferably, said one wall portion across which the container opening extends is substantially planar and extends substantially perpendicularly to the base of the container.

The container opening is preferably elongate and substantially linear. It has been found that such a container opening provides excellent pouring characteristics, is easy to use, and easy to reseal. However, the container opening may be configured and shaped in any preferred manner. For example, the container opening may be cut out from one of the converging wall portions. In this respect, the container opening may be substantially D-shaped. The upright of the D-shape may be at, or extend substantially parallel to the container apex where the two wall portions converge.

In an embodiment, at least one of the two opposed wall portions is extended beyond the container opening to define a spout or hinged flap which is connected to said container opening about a longitudinal fold extending along the opening.

Preferably, the first of said wall portions extends substantially perpendicularly to the base of the container, and at least part of the second of said two wall portions extends at an angle relative to the base.

Alternatively, the second wall portion comprises a substantially planar wall portion extending generally linearly at an angle to the base.

For example, the second wall portion has a first part extending from the base substantially perpendicularly thereto, and a second part extending from the first part to said container opening, the second part extending at an angle to the base.

To use the container, the seal between the spout and the one wall portion is broken, the spout is lifted to extend upwardly, and pressure is applied to the ends of the opening to open it. The pressure causes the wall portions forming the spout to move apart. To close the container again, the spout is refolded.

In an embodiment, removable closure means may be provided to reseal the container. Preferably, the closure means comprise a clip engageable with the folded spout.

In an embodiment, the clip is a substantially elongate member, for example, of a plastics material, which is substantially U-shaped in cross-section and has two limbs which converge towards their open end. The clip is formed to have resilience to facilitate its engagement on the spout at its fold.

The present invention also extends to a container comprising a substantially rectangular base, and a peripheral wall extending upwardly from said base to an apex, wherein the peripheral wall, at least adjacent said apex, is in the shape of a substantially upright wedge, the apex of the wedge defining the apex of the container, and wherein a container opening is defined at or proximate to said apex.

It has been found that a wedge shape is particularly advantageous and leads to the provision of an easy to open and resealable container opening. The upright wedge shape may be provided simply in an upper part of the container or the whole container may be so shaped. Where only the upper part of the container is in the shape of a substantially upright wedge, the rest of the container may be any required shape.

Although containers of the invention were originally designed as liquid containers, it is clear that they can be used for packaging either liquids or solids. A container of the invention may be made of any suitable materials and by any appropriate process. For example, the container may be moulded of a plastics material. Alternatively, the container may be folded from paper, card, cardboard or other web material. Where a folded construction is to be used for packaging liquids, the material to be folded will either be liquid proof or coated, laminated or impregnated with a liquid proofing material. For example, the container may be constructed from a blank of cardboard coated with a thermoplastics material.

The method of manufacture of the container will be chosen to suit its material and the intended contents. For example, high volume packaging, such as used for milk and soft drinks, generally employs processes where the container is not preformed, but is filled as it is constructed using purpose built machinery.

It will be appreciated that the overall configuration of the container will vary as a result of its manufacturing process. For example, where the container has been preformed by folding from a blank, wall portions of the peripheral wall may be connected to each other along sharply folded edges. Alternatively, if the container has been injection moulded, or formed during a filling process, the transitions between adjacent wall portions will be less sharp.

In an embodiment in which the container is formed during filling, containers are formed in pairs from a generally hollow tube. The resultant container has a much more rounded shape than one formed by folding from a blank.

According to a further aspect of the present invention there is provided a container comprising a substantially rectangular base, and a peripheral wall extending upwardly from said base towards an apex, said peripheral wall being defined by first and second pairs of opposed side walls, wherein the two side walls of said first pair are substantially triangular in shape and are arranged such that upper edges of the two side walls of the second pair converge, and wherein a container opening is defined at the apex of said container.

In an embodiment, the two converging side walls of the container define the container opening therebetween.

Preferably, each of the substantially triangular side walls of the first pair is shaped as a substantially right angled triangle, one side wall of the second pair extends substantially at right angles to the base, and the other side wall of the second pair extends at an acute angle to the base. The resultant container is therefore in the shape of a substantially upright wedge.

It has been found that the wedge shape provides a container which is 100% volume efficient, and has a lower centre of gravity as compared to cuboid containers, for example. Furthermore, two such wedge shaped containers can be put together to form substantially a cuboid which facilitates the stacking and transport of a plurality of the containers.

To facilitate pouring and resealing of the container, the two side walls of the second pair are preferably extended beyond the container opening to define a spout. Preferably, the spout is connected to said container opening about a longitudinal fold extending along the opening.

In the initially closed container, the spout is preferably folded downwardly about said longitudinal fold and sealed to one of the second pair of side walls. Preferably, the spout is sealed to the side wall of the second pair which extends at an angle to the base.

To use the container, the seal between the spout and the side wall is broken, the spout is lifted to extend upwardly, and pressure is applied to the ends of the opening to open it.

Containers of the invention may be designed to have additional features. For example, and particularly for larger size containers, the construction may be such that a handle is provided. Such a handle is conveniently formed in one of the converging wall portions. In a preferred embodiment, the handle is supported on the converging wall portion which extends at an angle to the base.

Of course, any such handle formed may have any desired shape or configuration. It may be provided with one or more cut outs in which fingers of a user may be received, and/or it may be provided with ribbed or other textured surfaces to facilitate gripping.

Embodiments of the present invention will hereinafter be described, by way of example, with reference to the accompanying drawings, in which.

FIGS. 1 to 4 show a first embodiment of a container of the invention for packaging liquids or solids. In this respect, FIGS. 1 to 4 illustrate a container made by folding a blank. If the product to be packaged is a solid, for example, salt, sugar, rice, dried pasta, breakfast cereal, washing powder, coffee or the like, the blank illustrated in FIG. 1 may be of paper, card, cardboard or other material. If the container is to hold a liquid, for example, milk, fruit juice, a non-carbonated beverage, cooking or engine oil, or the like, then the blank of FIG. 1 will be made from an appropriate liquid proof material. Commonly, the blank will be made of paper, card or cardboard coated, laminated, impregnated or otherwise sealed by a liquid proof material, for example, a thermoplastics material.

Figure 1:
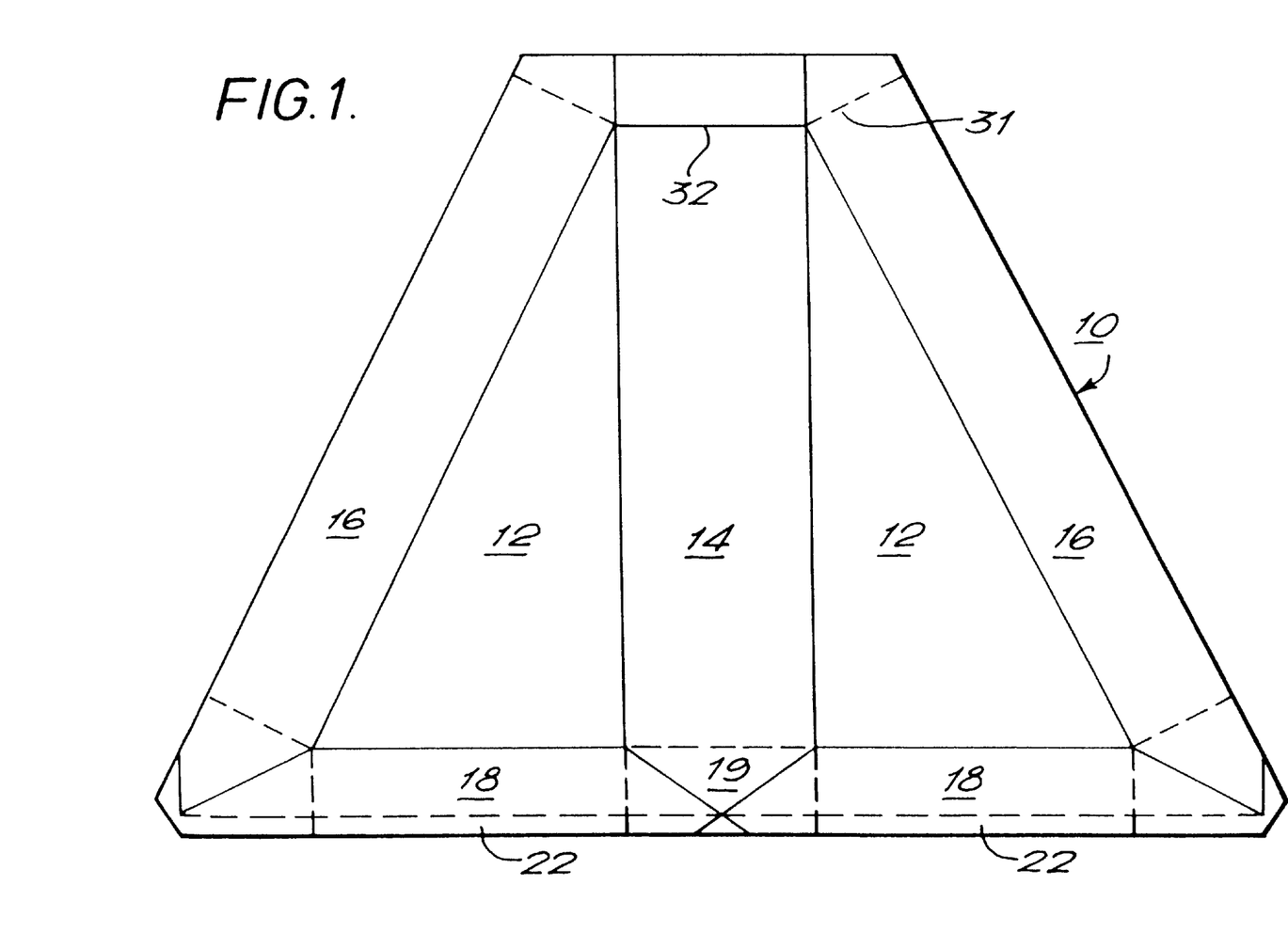
FIG. 1 shows a blank from which a container of one embodiment of the invention may be formed.

The blank, as 10 in FIG. 1, is formed in any suitable manner. For example, the blank 10 may have been cut from a web of suitable material and then embossed or scored to form fold or score lines. These operations may have been performed sequentially or some or all may be performed simultaneously. Generally, these operations would be performed by available automatic machinery. In FIG. 1, the surface of the blank which is visible is that which will form the internal surface of the finished container. The various fold or score lines formed in the blank are illustrated and it should be noted that those lines illustrated by solid lines are indented in the inner surface such that the material on either side thereof can be folded outwardly of the paper. Those score or fold lines which are shown in dotted lines project from the surface illustrated such that the material of the blank would be folded away from the plane of the paper. It should also be noted that the manner in which the fold or score lines are illustrated is used to show their position in the blank and their direction of folding only. In this respect, the manner in which each fold or score line is produced and its construction can be chosen as is required.

The blank 10 of FIG. 1 is formed such that two generally triangularly shaped panels 12 are defined therein. In the completed container these panels 12 form two substantially triangular shaped opposing side walls. A substantially rectangular panel 14 is interposed between the panels 12 to form an upright side wall in the completed container. The final side wall of the container, which will oppose, but extend at an angle to, the upright wall 14, is formed from two panels 16 at each end of the blank 10 which are arranged to overlap.

At the base of each of the triangular panels 12 a respective rectangular panel 18 is defined between which a further rectangular panel 19 is interposed. The two rectangular panels 18 are arranged, in the completed container, to substantially abut and to form together a substantially rectangular base of the container. A sealing strip 22 is defined along the length of the base of the blank 10 and on formation of the container the two sections of the strip 22 adjacent the panels 18 are sealed together to enable the panels 18 to form the base. The sealed strips are then folded over to extend along and lie against the rectangular base so formed.

The rectangular panel 19 is arranged to form a triangular structure at one end of the base which is to be sealed to the base to ensure fluid tightness. Similarly, a triangular structure is arranged to be formed at the base of the inclined wall formed by the overlapping panels 16. This structure also will be bent over and sealed to the rectangular base.

Figure 2:
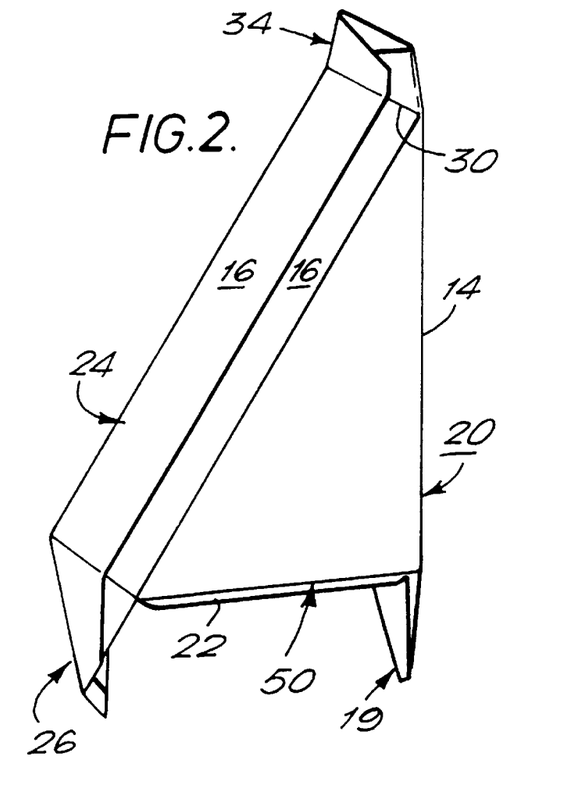
FIG. 2 shows the blank of FIG. 1 during formation of a container.

A partly completed container 20 formed from the blank of FIG. 1 is illustrated in FIG. 2. To form the container, the blank is folded along the main fold lines delimiting the panels, 12, 14 and 16 to form the overall substantially wedge shaped configuration of the container. The two panels 16 are overlapped to define the inclined side wall 24 for the container which is opposed to the upright side wall 14 as described above. The two portions of the sealing strip 22 adjacent the base of each triangular panel 12 are fastened together such that the two panels 18 abut and define a rectangular base 50 of the container. The portions of the sealing strip 22 are sealed together and are folded over and sealed to the base 50.

It will be seen from FIG. 2 that the partly formed container 20 has a substantially rectangular base 50 and that the upright wall 14 extends substantially at right angles to the base 50. The two substantially triangular panels 12 define a pair of spaced, opposed side walls 12. The upright wall 14 opposes the inclined wall 24 which extends at an acute angle to the base 50. The upright wall 14 and the inclined wall 24 converge towards the apex of the container 20 at which a linear container opening 30 is defined.

Where the container is constructed from a thermoplastic coated material, for example, for use for storing liquids, the blank is heated as it is formed. This means that a seal is formed between the overlapping panels 16 and similarly the portions of the strip 22 are sealed together and to the base 50. It will also be seen that extensions at the base of each overlapping panel 16 form a triangular sealing member 26 similar in shape to the member 19 at the base of the panel 14. In the illustrated embodiment, these members 19, 26 are folded over to contact the base and are sealed thereto. However, and if required, the members 19, 26 may be folded over and sealed to respective side walls 14 and 24.

As stated above, the pair of opposed side walls 14 and 24 converge at their upper edges to define the container opening 30. This container opening 30 extends longitudinally, is substantially linear, and is defined by and between fold lines 31 and 32 of the blank 10 of FIG. 1. The container opening 30 will generally be sealed along its longitudinal extent after forming and filling of the container. To provide means to re-close the opened container, and to facilitate pouring, the container 20 is provided with a spout 34 which is defined by panels in the blank forming extensions to the panels 14 and 16. When the container has been formed and filled, the resultant spout 34 is folded about the fold lines 31 and 32, which generally coincide with the seal of the container opening 30, and the spout is heat sealed to the wall 24.

Of course, it will be appreciated that the manner in which the container is constructed, and the order in which it is constructed and sealed will depend upon the filling process. The description above describes the construction where the container is preformed from a blank and then subsequently the contents are filled into the container by way of the container opening 30. In other cases, particularly for packaging solids, the container opening 30 may be closed first and the contents filled through the base. For solids, a simpler base construction, for example, formed from a respective flap on each side wall, may also be provided.

Figures 3, 3A:
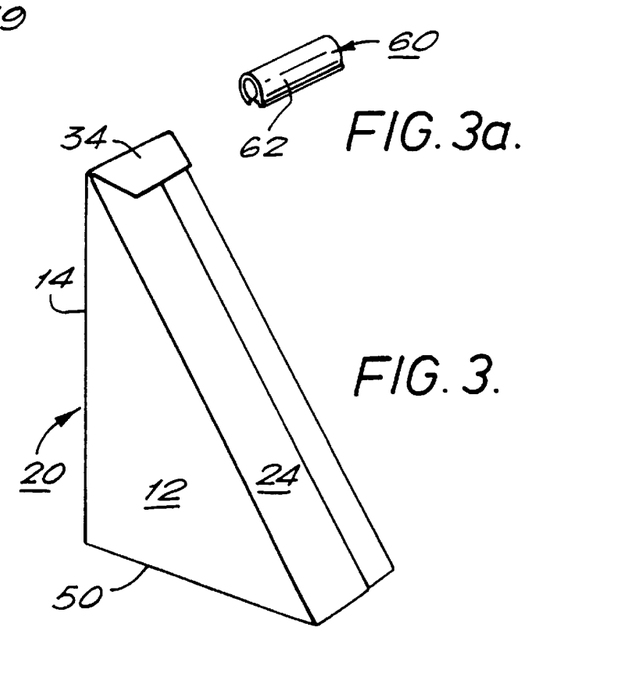
FIG. 3 shows a completed, filled and subsequently opened container formed from the blank of FIG. 1.
FIG. 3a shows one embodiment of a clip for resealing the container.

It should be noted particularly, that the container of FIGS. 2 and 3 may be constructed, filled and sealed by an appropriate form-fill-seal process using automatic machinery. In such an automatic process filling through the opening 30 is not necessary, and the construction and filling of the container will generally occur simultaneously.

Figure 3B:
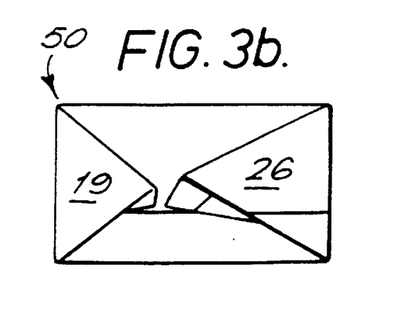
FIG. 3b shows a plan view of the base of the container of FIG. 3.

FIG. 3 shows a perspective view of the completed and filled container 20 after subsequent opening. FIG. 3b shows the base 50 of the completed container 20. When it is required to obtain access to the contents of the container 20 the seal between the spout 34 and the inclined wall 24 has to be broken. This is generally possible by using a thumb nail. The spout 34 is then lifted to extend substantially in line with the upright wall 14, for example, as shown in FIG. 2. In this position a squeezing pressure applied to the opening 30 at either end thereof tends to move the two walls of the spout away from each other. If the container has a seal along the extent of the container opening 30, such pressure may not be sufficient to break the seal. In this case, the seal can easily be broken by poking a finger or thumb down into the spout 34.

It has been found that the elongate container opening 30 pours extremely efficiently. If a large volume of liquid, for example, is to be poured, it should be poured over the extension to the wall 14. Where only a small amount of liquid is to be dispensed, it should be poured from one of the corners of the spout 34 at one of the ends of the linear opening 30. It will be seen (FIG. 2) that the extension of the inclined wall 24 forming the spout 34 is shaped. This facilitates drinking directly from the container 20.

Not only does the container 20 illustrated have extremely good pouring characteristics, it is also very easy to reseal. To reseal the container it is necessary only to fold the spout 34 about the fold lines 31, 32 to lie against the inclined wall 24. The spout 34 then needs to be held in this position to function as a closure flap. In this embodiment, the spout is held by a clip 60, which is illustrated in FIG. 3a, and which is engaged along the fold lines 31, 32 of the spout.

The clip 60 may be constructed in any appropriate manner. Preferably the clip comprises an elongate member which is substantially U-shaped in cross-section with the two limbs 62 thereof converging at their open end. Preferably the clip 60 is made of a resilient material, such as a plastics material, such that the two limbs 62 may be moved apart to facilitate engagement thereof on the spout 34 but such that they tend to move towards one another to keep a firm engagement on the spout 34. The clip 60 illustrated has limbs 62 which are curved. However, the clip may alternatively be constructed to have limbs which are substantially planar.

Figure 4:
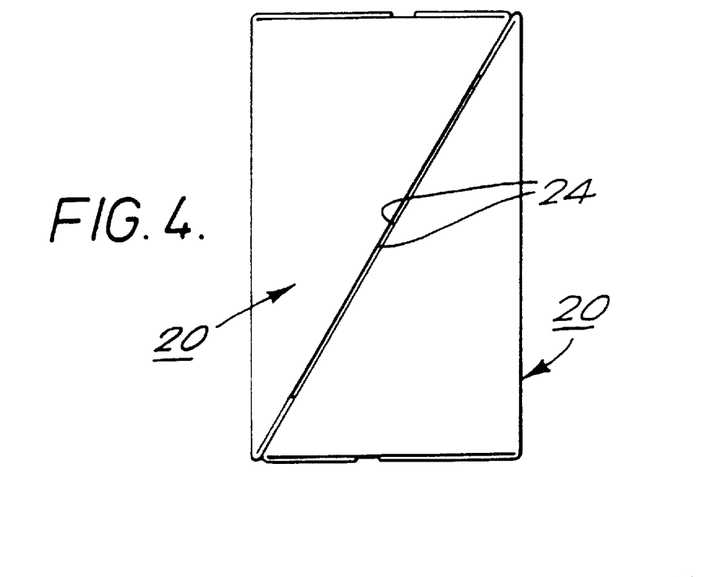
FIG. 4 shows schematically how two containers of the invention can be arranged for stacking and storage purposes.

FIG. 4 illustrates how two containers 20 of the invention can be positioned together to define a substantially cuboid space. This facilitates packing and storing of the containers when filled. If required, the inclined walls 24 of two adjacent containers may be lightly glued together, or the two containers 20 could be shrink wrapped together or otherwise packaged. Packaging of two separate containers 20 in this manner can be helpful, for example, to encourage or facilitate the sale of two different items together. The arrangement of FIG. 4, for example, could contain a snack lunch with one of the containers 20 being filled with a drink and the other containing sandwiches. Of course, where a container 20 is to contain a single large item, such as sandwiches, for example, the liquid proof sealing of the container as described above would not be required and access by means other than the opening 30 would be necessary. For example, the ability to part the panels 16 of the wall 24 or otherwise remove that wall would be provided.

The container of FIGS. 2 and 3 has been specifically described above as formed from a blank and at least, in part, post filled. However, and as stated above, it would be possible to modify the blank as illustrated, for example, to enable it to be constructed and filled on a single machine, as is common for milk and other liquids. In such a case the peripheral wall of the container is constructed to form a generally hollow tube, the contents are introduced into the container from one end and the ends are formed and sealed. In such circumstances a pair of containers may be formed from each generally hollow tube.

Figure 5:
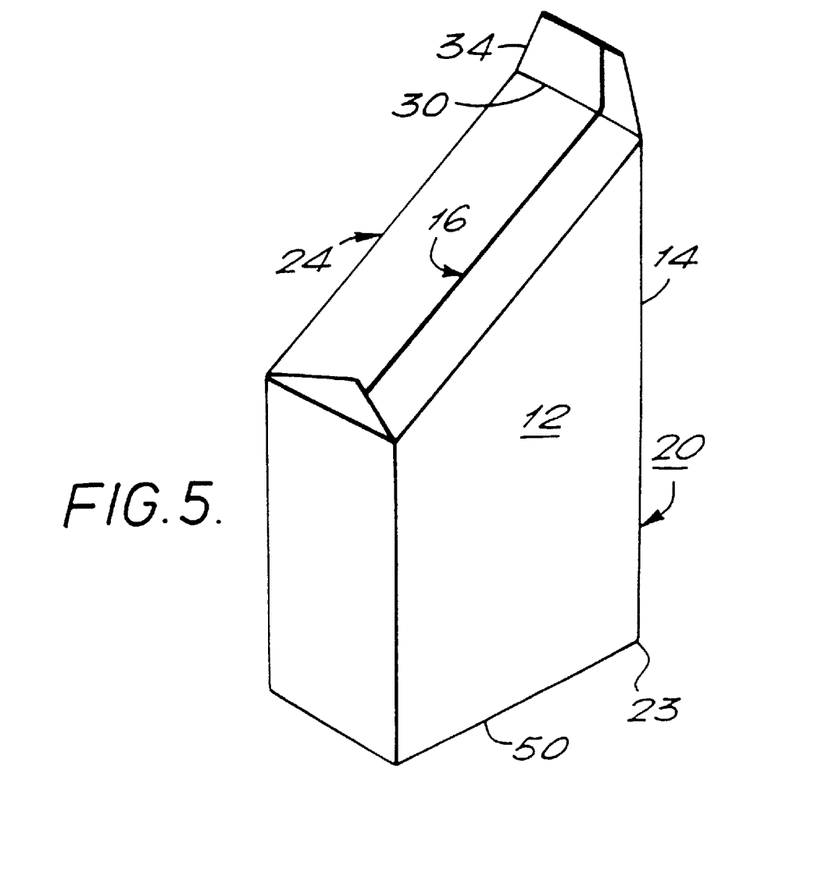
FIG. 5 shows a completed, filled and subsequently opened container of a second embodiment of the invention.
Figure 6:
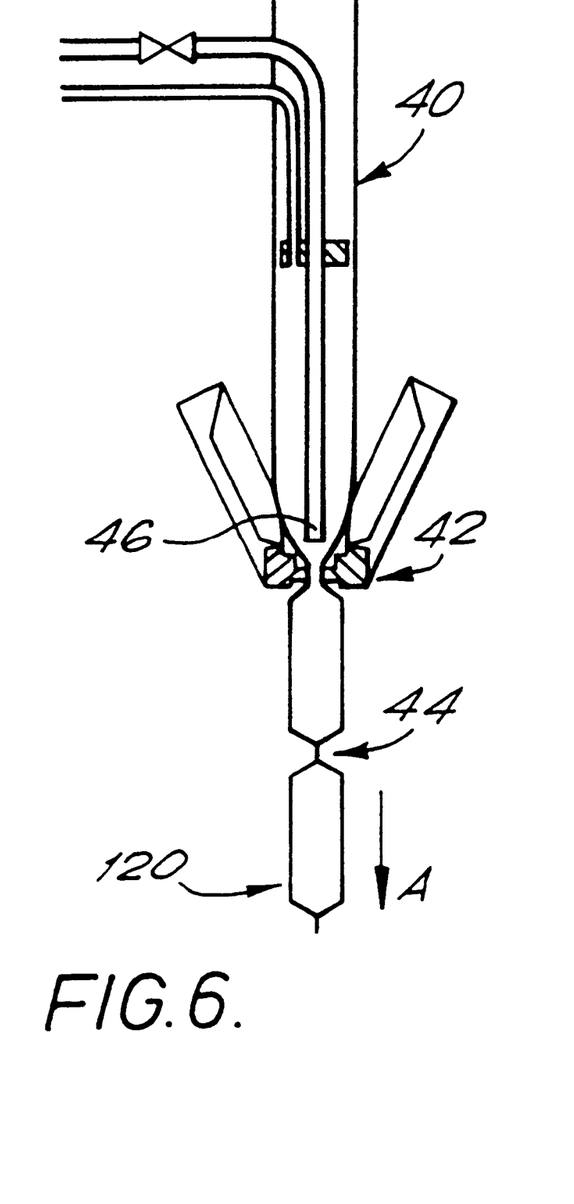
FIG. 6 shows schematically the filling and forming of containers using a form-fill-seal method.
Figure 7:
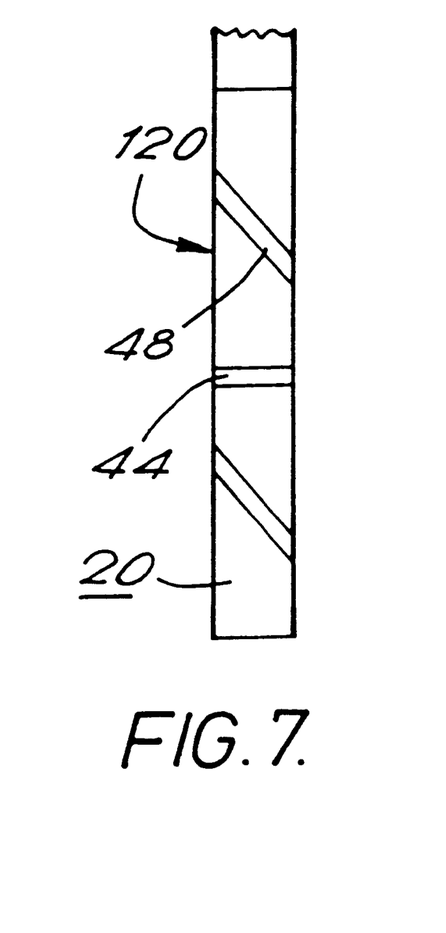
FIG. 7 shows schematically the formation of a container as shown in FIG. 5 by the process of FIG. 6.

In this respect, FIG. 5 shows an alternative embodiment of a container of the invention for packaging liquids or solids. FIGS. 5 to 7 illustrate a container made by automatic forming and filling machinery. Of course, and as previously, if the product to be packaged is a solid, for example, salt, sugar, rice, dried pasta, breakfast cereal, washing powder, coffee or the like, the container may be of paper, card, cardboard or other material. If the container is to hold a liquid, for example, milk, fruit juice, a non-carbonated beverage, cooking or engine oil, or the like, then the container will be made from an appropriate liquid proof material. Commonly, the container will be made of paper, card or cardboard coated, laminated, impregnated or otherwise sealed by a liquid proof material, for example, a thermoplastics material.

It will be seen that the container 20 shown in FIG. 5 has a substantially rectangular, generally planar, base 50 and an upright wall 14, which is planar, extending substantially at right angles to the base 50. The upright wall 14 extends from the base 50 to a linear container opening 30. The upright wall 14 is connected to two opposed side walls 12, and a fourth wall 24, opposed to the upright wall 14, also extends from the base 50 to the container opening 30. In these respects, the embodiments of the container shown in FIGS. 3 and 5 are similar. However, it will be seen that, in the embodiment of the FIG. 5, a first part of the wall 24 extends upright substantially at right angles to the base, and that the rest of the wall 24 then extends at an angle to the base 50 such that the inclined portion of the wall 24 and the upright wall 14 converge towards the apex of the container 20. It will therefore be appreciated that the container opening 30, defined by the converging walls 14 and 24, extends generally across the upright wall 14 and is spaced above, but is generally in alignment with, a side edge 23 of the base 50. The cranked shape of the opposed wall 24 means that the two side walls 12 are each in the shape substantially of a triangle atop a rectangle.

One manner of manufacturing the container shown in FIG. 5 is illustrated schematically in FIGS. 6 and 7. As shown, a tube 40 of a suitable material is formed and is moved in the direction of arrow "A" passed a filling and forming head 42. The head 42 nips and seals the tube at spaced areas 44 and at the same time a filling head 46 discharges contents, such as a liquid, into the tube 40. It will be appreciated that as this process continues a number of filled and sealed containers 120 separated by the seals 44 are formed. FIG. 7 shows a side view of a series of the containers 120 and illustrates how each one may be divided along a seal 48, which extends at an angle to the longitudinal extent thereof to form two containers as 20. The containers 20 are then separated from one another by severing them between the seals 44 and 48 so that each container 20 has a sealed base and a sealed top. It will be appreciated that the seal 48 extending at an angle to the longitudinal extent will extend in the wall portion 24 as indicated at 16 in FIG. 5.

Although the production method is described above with reference to the division of a container 120 into two separate containers 20, it is preferred that the production method of FIGS. 6 and 7 be a continuous process. In this case it will be appreciated that each container 20 will be formed individually and in succession. For example, sealing and cutting means (not visible) may be provided for sealing and separating containers 20 from the filled tube 40 by cuts extending alternately at right angles and at 45°, for example, to the direction of feed to the tube 40.

As stated above, the pair of opposed side walls 14 and 24 of the container 20 converge at their upper edges to define the container opening 30. This container opening 30 extends longitudinally, and is substantially linear. To provide means to reclose the opened container, and to facilitate pouring, the container 20 is provided with a spout 34, the opened and truncated version of the spout 34 being shown in FIG. 5. When the container has been formed and filled, the resultant spout 34 is folded about fold lines which generally coincide with the longitudinal extent of the container opening 30, and the spout is heat sealed to the wall 24.

When it is required to obtain access to the contents of the container 20 the seal between the spout 34 and the inclined wall 24 has to be broken. This is generally possible by using a thumb nail. The spout 34 is then lifted to extend substantially in line with the upright wall 14, for example, as shown in FIG. 5. To open the container, a substantially triangular end portion (not shown) of the spout 34 is cut off to leave the truncated spout 34 Illustrated. In this position a squeezing pressure applied to the opening 30 at either end thereof tends to move the two walls of the spout away from each other.

It has been found that the elongate container opening 30 pours extremely efficiently. If a large volume of liquid, for example, is to be poured, it should be poured over the extension to the wall 14. Where only a small amount of liquid is to be dispensed, it should be poured from one of the corners of the spout 34 at one of the ends of the linear opening 30.

Not only does the container 20 illustrated have extremely good pouring characteristics, it is also very easy to reseal. To reseal the container it is necessary only to fold the spout 34 to lie against either the inclined portion of the wall 24 or against the upright wall 14 so that the spout 34 functions as a closure flap. The spout 34 may be releasably held in this position by any suitable adhesive or mechanical means. For example, a clip, as clip 60 of FIG. 3a, may then be engaged along the folded spout.

Figures 8, 10:
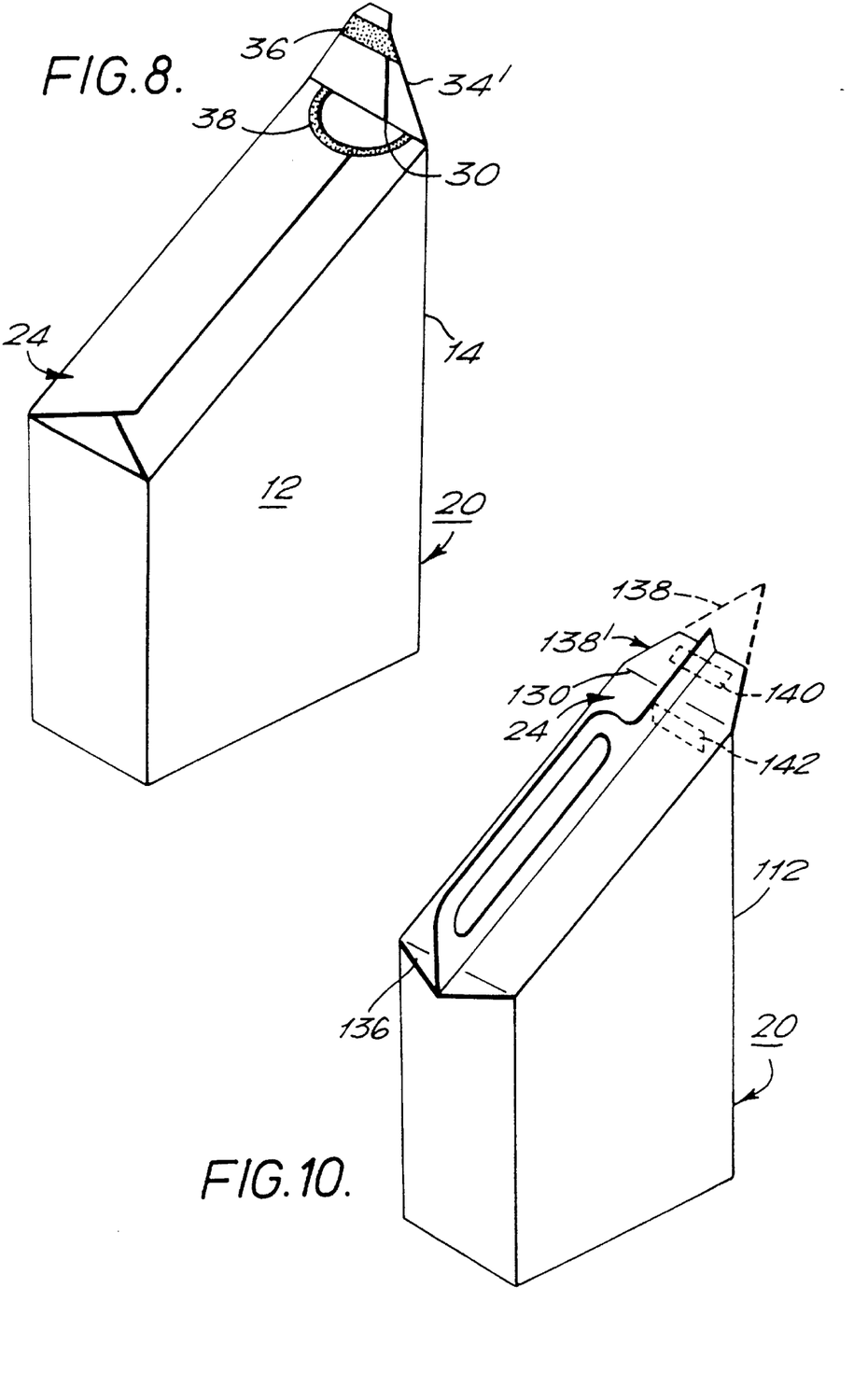
FIG. 8 shows a perspective view of a completed, filled and subsequently opened container of a further embodiment of the invention.
FIG. 10 shows a completed, filled and subsequently opened container formed from the blank of FIG. 9.

FIG. 8 shows a still further embodiment of a container 20 of the invention which, as the containers shown earlier, can be manufactured from any suitable material and by any suitable method. Specifically, the container 20 may be individually formed from blanks and post-filled, or it may be formed and filled in a single automatic process, for example by a form-fill-seal process.

The container 20 shown in FIG. 8 is very similar to that shown in FIG. 5 in that its side walls 12 are each shaped as a triangle atop a rectangle. The upright wall 14 extends substantially at right angles to the base 50 and the wall 24 extends substantially at right angles for part of its length and then extends at an angle to the base 50 such that it converges towards the upright wall 14. At the apex of the container, where the walls 14 and 24 meet, there is a hinged flap 341 which may be formed either as an extension of both of the walls 24 and 14, as in the previous embodiment, or may be formed as an extension only of the wall 14. The hinged flap 341 may function as a spout. However, because of the nature of the container opening 30 in this embodiment, it is preferred that the hinged flap 34' be provided only as a hinged closure flap.

It will be seen that in the embodiment of FIG. 8 the container opening 30 is formed by a cut out in the wall 24 arranged adjacent to the apex of the container.

The originally formed and filled container 20 of FIG. 8 will have the hinged flap 34' sealed to the inclined portion of the wall 24. When this seal is broken, and the hinged flap 34' is moved to the open position illustrated, it reveals fastening means 36 on the hinged flap 34' and cooperating fastening means 38 around the container opening 30. These enable the hinged flap 34' to be retained in its closed position but are arranged to be releasable. For example, the fastening means 36, 38 may be Velcro™, adhesives and the like. Where the container is made on an individual basis, for example, the originally completed and filled container may also be sealed by the fastening means 36, 38.

Figure 9:
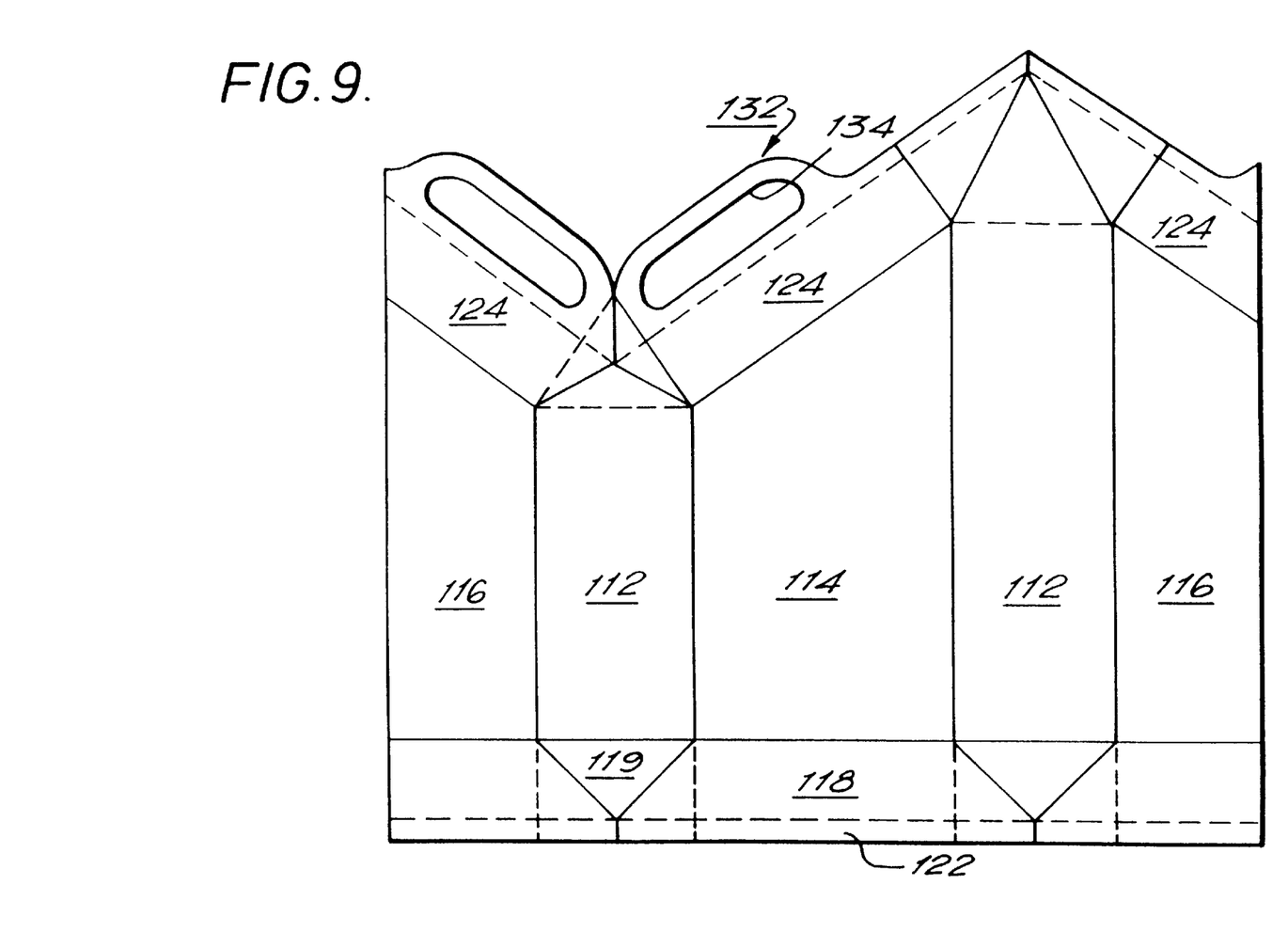
FIG. 9 shows a blank from which a further embodiment of a container of the invention may be formed.

FIGS. 9 and 10 illustrate a still further embodiment of a container 20 of the present invention. The container of FIG. 10 is shown as formed from a blank, which is shown in FIG. 9. However, and as with all of the previous embodiments, the method by which the container is formed and the material from which it is formed is a matter of choice.

FIG. 9 shows a blank 110 from which the container of FIG. 10 may be formed. As is conventional, the blank 110 may have been cut from a web of suitable material and then embossed or scored to form fold or score lines. These operations may have been performed sequentially or some or all may be performed simultaneously. Generally, these operations would be performed by available automatic machinery. In FIG. 9, the surface of the blank which is visible is that which will form the internal surface of the finished container. The various fold or score lines formed in the blank are illustrated and it should be noted that those lines illustrated by solid lines are indented in the inner surface such that the material on either side thereof can be folded outwardly of the paper. Those score or fold lines which are shown in dotted lines project from the surface illustrated such that the material of the blank would be folded away from the plane of the paper. It should also be noted that the manner in which the fold or score lines are illustrated is used to show their position in the blank and the direction of folding only. In this respect, the manner in which each fold or score line is produced and its construction can be chosen as is required.

The blank 110 of FIG. 9 is formed such that two substantially rectangular panels 112 are formed on either side of a panel 114 which is generally trapezoidal in shape having its two sides adjacent the rectangular panels 112 extending substantially parallel to one another. In effect, the trapezoidal panel 114 is in the shape generally of a triangle atop a rectangle and it gives to the completed container a similar shape.

Each rectangular panel 112 is also attached to an outer, generally trapezoidal panel 116. These panels 116 are arranged to overlap and to be sealed together in the completed container 20 to produce a wall portion which opposes and is generally the same shape as the trapezoidal panel 114.

At the base of each of the panels 112, 114 and 116 a number of rectangular and triangular panels 118, 119 are defined together with a sealing strip 122. These panels are arranged, as the panels 18 and 19 in FIG. 1, to form a substantially rectangular base of the container. The panels 118, 119 also form respective triangular structures at each end of the rectangular base and are sealed to that base to ensure fluid tightness.

At their other ends, the panels 112, 114 and 116 have further panels 124 attached thereto which are arranged to define an inclined wall 24 of the container 20. This inclined wall 24, as is shown in FIG. 10, opposes an upright wall 112 formed by one of the rectangular panels 112. The inclined wall 24 and the opposing upright wall 112 converge to an apex 130 of the container 20. In this respect, it will be appreciated that the three generally rectangular panels 124 of the blank of FIG. 9 will be sealed together to produce the wall 24. It will be seen, also, that two of the panels 124 each carry an extension 132 with a cut out 134. These two extensions 132 cooperate to form a carrying handle for the container.

The inclined wall 24 has a triangular flap 136 formed at one end thereof and a longer triangular flap 138 at the other end thereof. This longer triangular flap 138 is formed by extensions of the wall 24 and of its opposed wall 112 extending beyond the apex 130 of the container. When the container is constructed and filled initially the extensions of the walls 24 and 112 form a completely closed triangular flap 138 which is hinged about the apex 130.

In use, access to the contents of the container can be obtained by cutting the triangular flap 138, to remove the portion thereof shown in dashed lines in FIG. 10, to provide a truncated, openable spout 138'. Re-closing of this structure is possible by the use of a clip or other means as described earlier. In the embodiment illustrated, a Velcro™ strip indicated at 140 on the hinged flap 138 is arranged to cooperate with a further such strip 142 provided on the upstanding wall 112. It will therefore be appreciated that the container of FIG. 10 may be resealed by folding the spout 138' about a hinge line such that the two strips 140 and 142 cooperate to retain the spout in position and the container 20 is thereby closed and resealed.

The invention has been described and illustrated with reference to a number of examples of a container. However, it will be appreciated that there are very many variations possible to the constructions described. For example, the production of containers from blanks which are post-filled has been described, as has the use of a form-fill-seal apparatus. However, it is alternatively possible to form a container of the invention by moulding, for example, plastics material and filling the container either during or after the moulding process. This might be preferred where the contents of the container, for example, are to be engine oil or the like.

Various configurations, in particular, have been illustrated for the closure flap or spout and for the container opening. Any appropriate shaping may be employed. Where resealable means are to be provided, these may be configured as required.

It will be appreciated that other modifications and variations may be made to the present invention within the scope of the attached claims.

What is claimed is:

1. A container comprising a base, an apex, and a peripheral wall extending upwardly from the base to the apex, wherein said base is substantially rectangular, and said peripheral wall is comprised of at least first, second, third and fourth upwardly extending wall portions, the first and third wall portions being opposed, and the second and fourth wall portions being opposed, wherein the first and third wall portions converge to define the apex of the container, said apex being linear and having a longitudinal extent which spans said second and said fourth opposed wall portions, said first wall portion extending from said base to the apex, and said third wall portion including at least a part extending at an angle relative to the base, wherein an elongate and substantially linear container opening is defined between said first and third wall portions and extends along the full longitudinal extent of said apex, wherein each of said first and third wall portions extends upwardly beyond said linear apex to together define a flap, said flap being hingedly connected at said linear apex, and wherein the first and third wall portions at the flap are separable to together define a spout.

2. A container as claimed in claim 1, wherein said third wall portion has a first part extending from the base substantially perpendicularly thereto, and a second part extending at an angle relative to the base, said second part of the third wall converging with said first wall portion to define said apex.

3. A container as claimed in claim 1, further comprising removable closure means provided to reseal said container.

4. A container as claimed in claim 3, wherein said removable closure means comprises a clip engageable with said hinged flap.

5. A container as claimed in claim 4., wherein said clip is a substantially elongate member having a substantially U-shaped cross-section.

6. A container according to claim 5, wherein the clip is a substantially elongate member of a plastics material, is substantially U-shaped in cross-section, and has two limbs which converge towards free ends thereof.

7. A container as claimed in claim 1, wherein a handle is formed in one of the first and third wall portions.

8. A container as claimed in claim 7, wherein said first wall portion extends substantially perpendicularly to the base of the container, and wherein said handle is formed in said part of said third wall portion that extends at an angle relative to said base.

9. A container according to claim 1, wherein said first wall portion extends substantially perpendicularly to the base.

* * * * *